(12) United States Patent
Holmes et al.

(10) Patent No.: US 7,389,044 B2
(45) Date of Patent: Jun. 17, 2008

(54) METHOD AND SYSTEM FOR PROVIDING A SIGNATURE SIGNAL IN AN OPTICAL NETWORK IN THE EVENT OF LOSS OF A CLIENT

(75) Inventors: David Michael Ryan Holmes, Nepean (CA); Paul Mark Reepschlager, Nepean (CA)

(73) Assignee: Alcatel-Lucent Canada Inc., Kanata, Ontario (CA)

( * ) Notice: Subject to any disclaimer, the term of this patent is extended or adjusted under 35 U.S.C. 154(b) by 470 days.

(21) Appl. No.: 11/184,966

(22) Filed: Jul. 20, 2005

(65) Prior Publication Data

US 2006/0034608 A1    Feb. 16, 2006

(51) Int. Cl.
*H04B 10/08* (2006.01)
(52) U.S. Cl. .............................. 398/16; 398/17; 398/31; 398/32; 398/33
(58) Field of Classification Search ............... 398/9, 398/10, 16, 17, 30–33, 69, 76, 151, 163
See application file for complete search history.

(56) References Cited

U.S. PATENT DOCUMENTS

| | | | | |
|---|---|---|---|---|
| 5,654,816 | A * | 8/1997 | Fishman | 359/349 |
| 5,956,165 | A * | 9/1999 | Fee et al. | 398/78 |
| 6,317,231 | B1 * | 11/2001 | Al-Salameh et al. | 398/34 |
| 7,187,862 | B2 * | 3/2007 | Mahlab | 398/10 |
| 2002/0135840 | A1 * | 9/2002 | Spagnoletti et al. | 359/128 |
| 2004/0008988 | A1 * | 1/2004 | Gerstal et al. | 398/45 |

OTHER PUBLICATIONS

IEEE Standard 802,3, Mar. 8, 2002, Part 3: Carrier sense multiple access with collision detection (CSMA/CD) access method and physical layer specifications, pp. 40, 41, 118-121.

\* cited by examiner

*Primary Examiner*—Dalzid Singh
(74) *Attorney, Agent, or Firm*—Victoria Donnelly

(57) ABSTRACT

An optical network including multiple nodes is subject to intermittent faults that may raise alarms in the system. The invention focuses on an optical network based on the Any rate architecture. A single fault such as a client failure at a node in such a network can give rise to a loss of client signal leading to multiple alarms detected at multiple points. To alleviate this problem this invention provides switching in a special Signature signal in place of the lost client signal. By detecting the Signature signal containing a specific code, the fault on the any rate-based architecture can be uniquely identified. In addition to fault identification, the Signature signal on the network makes it possible to maintain Clock and Data Recovery Locks at downstream nodes. The Signature signal serves also as a vehicle for carrying a special optical tag called Wavekey provided by the Wavelength Tracker technology developed by the Applicant. This optical tag includes a low frequency modulation of one or more dither tones onto an optical channel, which is uniquely identified by the tag. Maintaining the Wavekey is important for tracing the end-to-end path and power level of the signal on each wavelength. A method and a Field Programmable Gate Array-based system for the generation and identification of such a Signature signal that not only identifies the fault that has occurred on the optical network but also provides for the maintenance of the Wavekey, are described.

10 Claims, 6 Drawing Sheets

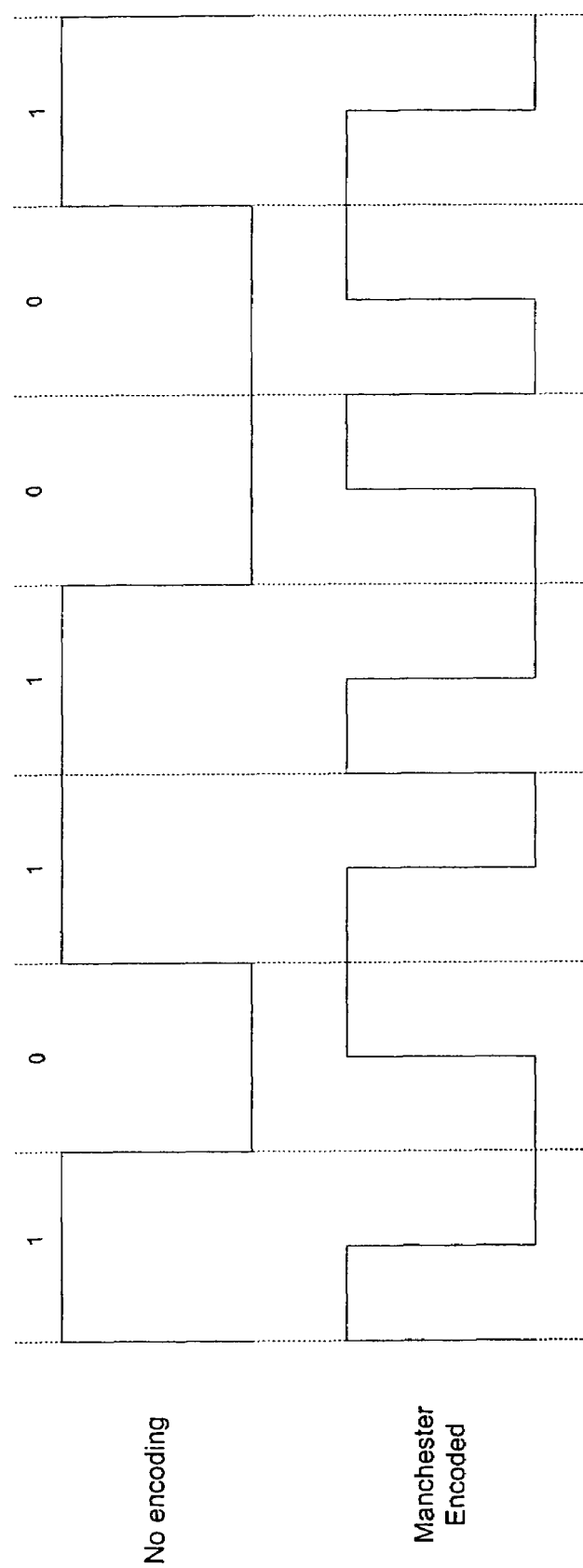

METHOD AND SYSTEM FOR PROVIDING A SIGNATURE SIGNAL IN AN OPTICAL NETWORK IN THE EVENT OF LOSS OF A CLIENT

FIELD OF INVENTION

The invention relates to optical communication systems, and in particular to a method and system for incorporating a specific Signature signal in an optical network when a client failure occurs, for reducing alarm propagation in an optical network.

BACKGROUND OF INVENTION

An optical network consisting of multiple nodes is subject to intermittent faults that may raise alarms in the system. The invention focuses on an optical network based on the Any rate architecture. The need for an Any rate solution to seamlessly transport less common protocols within traditional telecommunication based metropolitan area network has been well established over the past decade by major carriers. On such an enclosed network that does not have any vendor mid-span meet within the network, it is possible to support a variety of native protocols. A single fault such as a client failure at a node in the network can, however, give rise to loss of client signal leading to multiple alarms detected at multiple points. A number of methods exist in the prior art for handling the loss of the client signal. One approach is to switch off the optical source. Although simple, such an approach leads to the loss of optical power and can give rise to a multitude of alarms as well as loss of Clock and Data Recovery (CDR) locks at downstream nodes in the network. Another approach is to maintain a "keep alive" signal, a fixed rate clock for example. Although optical power is maintained the CDR lock is lost and multiple alarms may be raised at downstream nodes. Examining all the raised alarms and determining the root cause alarm that leads to the solution of the actual problem that has occurred on the system is a difficult and time-consuming task. This in turn can significantly increase the time required for returning service to the network element.

Thus there is a need in the field for developing improved methods and systems for identifying client failures on an optical network that is based on the Any rate architecture.

SUMMARY OF THE INVENTION

Therefore it is an objective of this invention to devise a method and system for generating a Signature signal when the client signal is lost due to a client failure.

A method for providing a Signature signal in an optical network in the event of failure of a client, the optical network contains channels, each having a unique tag in a form of a low frequency dither tone modulation called Wavekey generated by a Wavelength Tracker technology, the method comprising the steps of: detecting a failure of a client; switching in the Signature signal for identifying failure of a client and maintaining said Wavekey; transmitting said Signature signal through the optical network as a transmitted signal; receiving said transmitted signal at a receiver node as a received signal; and analyzing said received signal; wherein said Signature signal is a sequence of fault codes in a repeating pattern and includes said Wavekey.

The step of switching in the Signature signal comprises the steps of: generating the Signature signal; encoding the Signature signal; and replacing a lost client signal with an encoded Signature signal.

The step of analyzing the received signal comprises steps of: decoding said received signal for producing a decoded signal; performing pattern analysis on the decoded signal; and raising alarm when the Signature signal is present in said decoded signal.

The step of generating the Signature signal comprises the step of: generating a sequence of a fault code in a repeating pattern; wherein the fault code is a sequence of invalid codes. The invalid codes used are invalid 8B/10B codes.

The step of encoding the Signature signal comprises the step of: converting the Signature signal into a Manchester encoded signal.

The step of decoding said received signal comprises the step of: converting said encoded signal into the decoded signal using Manchester decoding. The method is applicable to an optical network that is based on an Any-rate architecture.

A system for providing a Signature signal in an optical network in the event of failure of a client, the optical network contains channels, each having a unique tag in a form of a low frequency dither tone modulation called Wavekey generated by a Wavelength Tracker technology, the system comprising: a transmission module for generating and transmitting the Signature signal for identifying failure of a client and maintaining said Wavekey; and a reception module for analyzing a received signal; wherein the output of the transmission module is connected to the input of the reception module through the optical network and the Signature signal is a sequence of fault codes in a repeating pattern and includes said Wavekey.

The transmission module comprises: a client failure detector; a Pattern Generator for generating the Signature signal; a Manchester Encoder for encoding said Signature signal; a multiplexer for switching in the Signature signal; and an Optical Transmitter for transmitting the Signature signal on the optical network.

The reception module comprises: an Optical Receiver for receiving the Signature signal; a Clock and Data Recovery (CDR) device for recovering clock and data; a Manchester Decoder for decoding said Signature signal; and a Pattern Analyzer for analyzing decoded Signature signal. The optical network used in the system is based on an Any-rate architecture.

BRIEF DESCRIPTION OF THE DRAWINGS

Further features and advantages of the invention will be apparent from the following description of the embodiment, which is described by way of example only and with reference to the accompanying drawings in which:

FIG. 5 shows an example of Manchester encoding.

DETAILED DESCRIPTION OF THE EMBODIMENT OF THE INVENTION

Wavelength Tracker is a technology that traces the end-to-end path and power level of the signal on each wavelength and is developed by Tropic Network. A light path to be monitored on an optical network can be identified by using Wavelength Tracker. The Wavelength Tracker technology applies a unique optical tag to each wavelength (channel) at the Dense Wavelength Division Multiplexing (DWDM) layer. The unique optical tag includes a low frequency modulation of one or more dither tones onto the optical channel, which uniquely identify the optical channel. This optical tag (also called a Wavekey) is applied to the optical channel at the source node of the light path. The optical tag is detectable at intermediate nodes on the light path via inexpensive decoders present on line cards. Detection of the optical signature is accomplished without an Optical-Electrical-Optical (OEO) conversion at intermediate nodes, thus resulting in a cost-effective solution. Wavelength Tracker technology is used for a variety of applications including optical power monitoring and loss of light avoidance as well as for fault identification. The technology for generating and detecting Wavekeys has been described in U.S. patent application Ser. No. 09/963,501 by Obeda, P. D., et al, entitled "Topology Discovery in Optical WDM Networks", filed on 27 Sep. 2001.

Figure 1A:
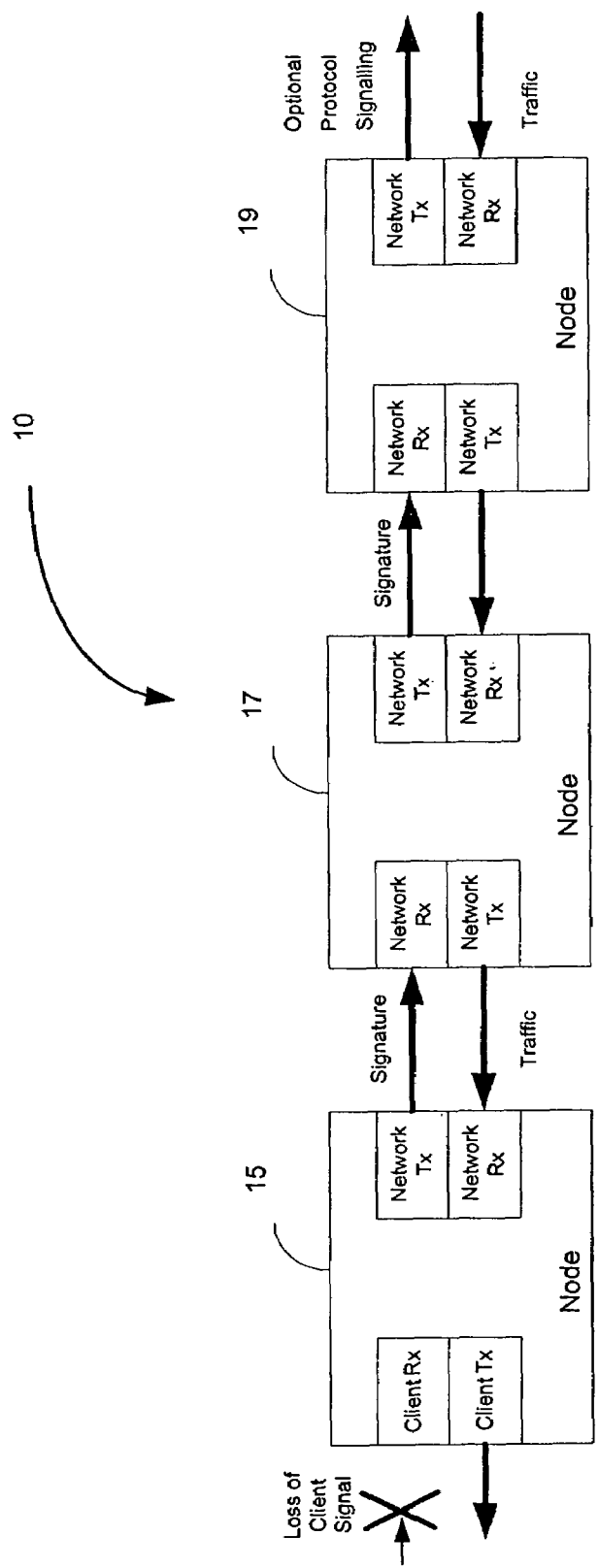
FIG. 1a shows an example network with a client failure.

It is thus important to maintain the Wavelength Tracker tag, Wavekey, under all conditions. In order for Wavelength Tracker to operate, an optical signal must be present on the fiber in the optical network. When a client failure occurs, an input client signal is no longer available to replicate across the network. An absence of the network optical signal will cause Wavelength Tracker to lose visibility into the optical network. This raises the need for another client-like signal to be generated in the place of the failed client signal (see FIG. 1a). This signal is the Signature signal that uniquely identifies the fault that has occurred and provides the optical signal necessary for maintaining the Wavekey. FIG. 1a shows an example optical network 10 consisting of sequence of nodes 15, 17 and 19. When a client failure occurs and the client signal at the input of the first node 15 is lost, a Signature signal is to be switched in to replace the lost client signal. This Signature signal is then replicated by the intermediate node 17 and is detected as the Signature signal at the receiver node 19 at the far end. This node 19 has the option of sending a protocol specific message to the client or extinguishing the signal. Such a generic Signature signal is effective in the context of an Any rate architecture because it is no longer required to handle the loss of signal particulars of each protocol supported. The main objective of this invention is to provide a method and system for the generation and identification of such a Signature signal that not only identifies the fault that has occurred on the optical network but also provides for the maintenance of the Wavekey, the Wavelength Tracker tag.

Figure 1B:
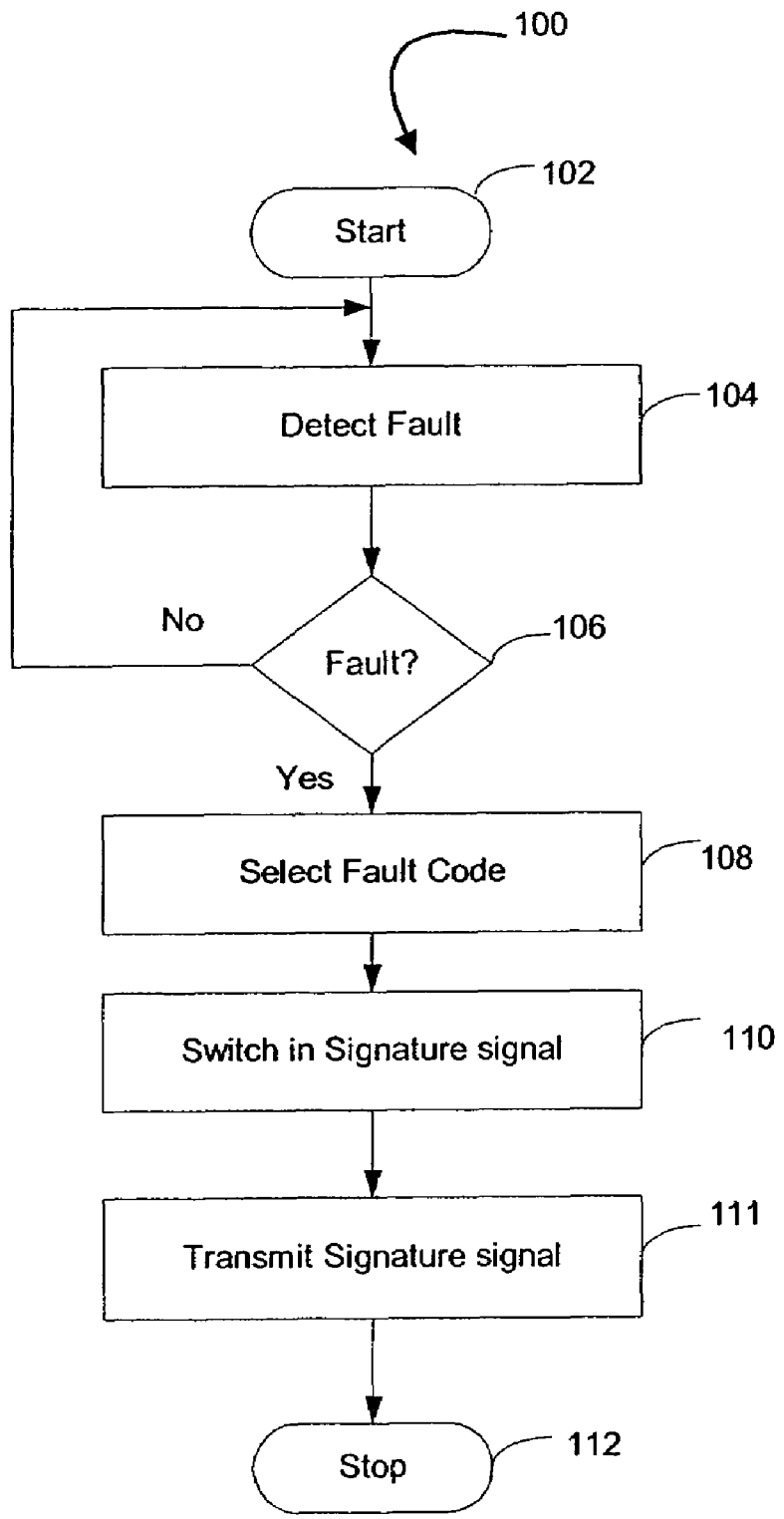
FIG. 1b presents the operations performed at the node in which a client failure occurs.
Figure 2:
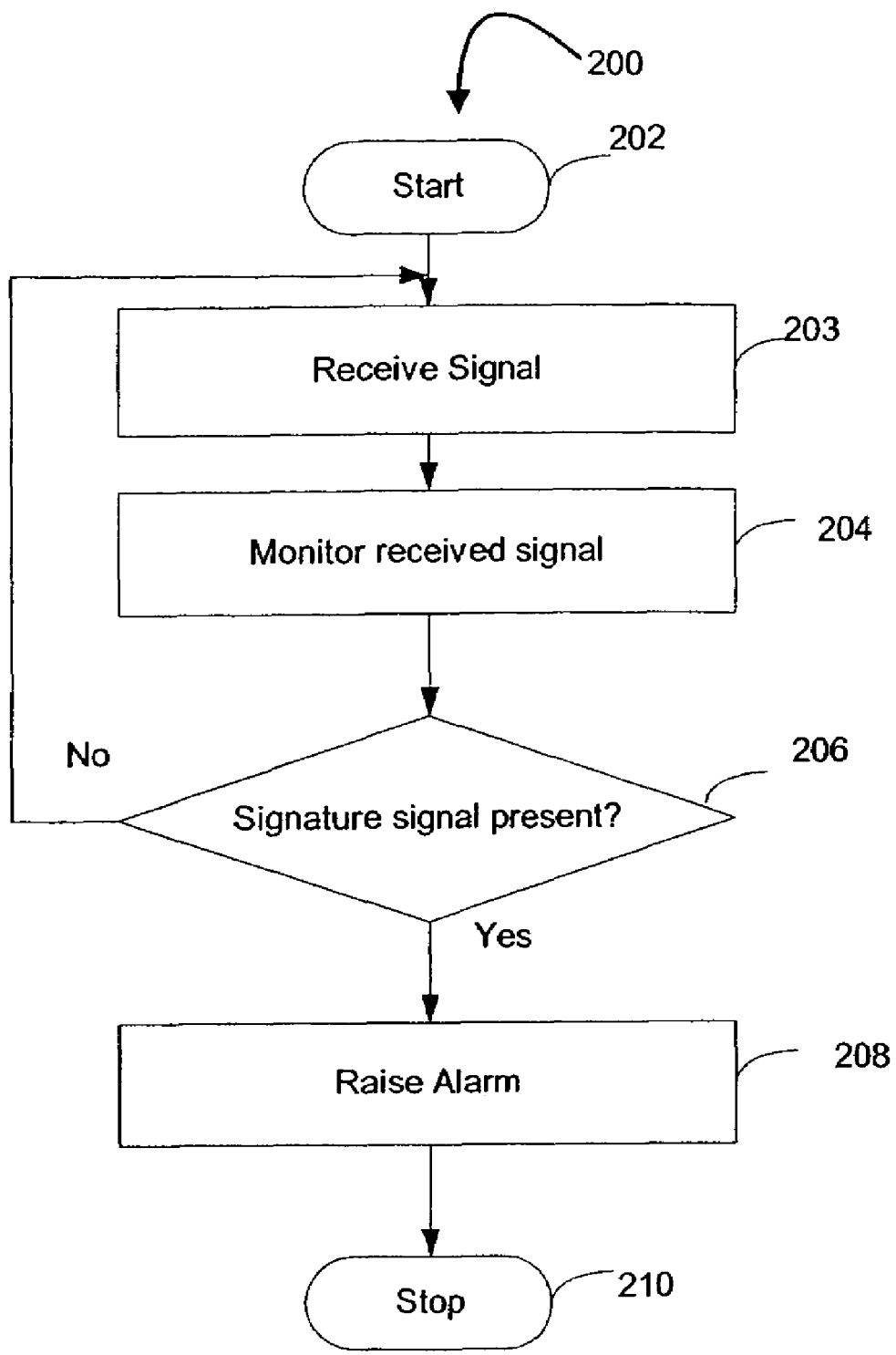
FIG. 2 presents the operations performed at the receiver node that receives the signals generated by the node at which client failure occurs.

The technique used for achieving the objective of the invention is explained with the help of flowchart 100 and flowchart 200 presented in FIG. 1b and FIG. 2 respectively. The operations at a node at which client failure occurs are explained with the help of flowchart 100 (see FIG. 1b). Upon start (box 102) the procedure detects whether a fault (client failure) has occurred on the system (box 104). On the detection of a fault the procedure exits 'Yes' from box 106 and selects the fault code corresponding to client failure to be transmitted (box 108). The Signature signal containing the fault code is then switched in (box 110) to replace the lost client. The procedure then starts the transmission of the Signature signal that is then through the network (box 111) and terminates (box 112). Once started the transmission of the Signature signal continues until the fault is corrected. If a fault did not occur the procedure exits 'No' from box 106 and loops back to the input of box 104.

The operations performed at the receiver node that receives this transmitted signal are explained with the help of the flowchart 200 presented in FIG. 2. Upon start (box 202) the procedure receives the optical signal transmitted (box 203) and monitors this received signal (box 204). Pattern analysis to detect whether the Signature signal is present is performed next (box 206). If the Signature signal is detected the procedure exits 'Yes' from box 206, raises the alarm corresponding to the fault code (client failure) (box 208) and terminates (box 210). If the Signature signal is absent, the procedure exits 'No' from box 206 and loops back to the input of box 203. The procedure captured in the flowchart 200 is continuously invoked at the receiver node in an endless loop. Thus, box 202 is entered immediately after leaving box 210. Once raised the alarm remains active as long as the fault persists on the system.

Figure 3:
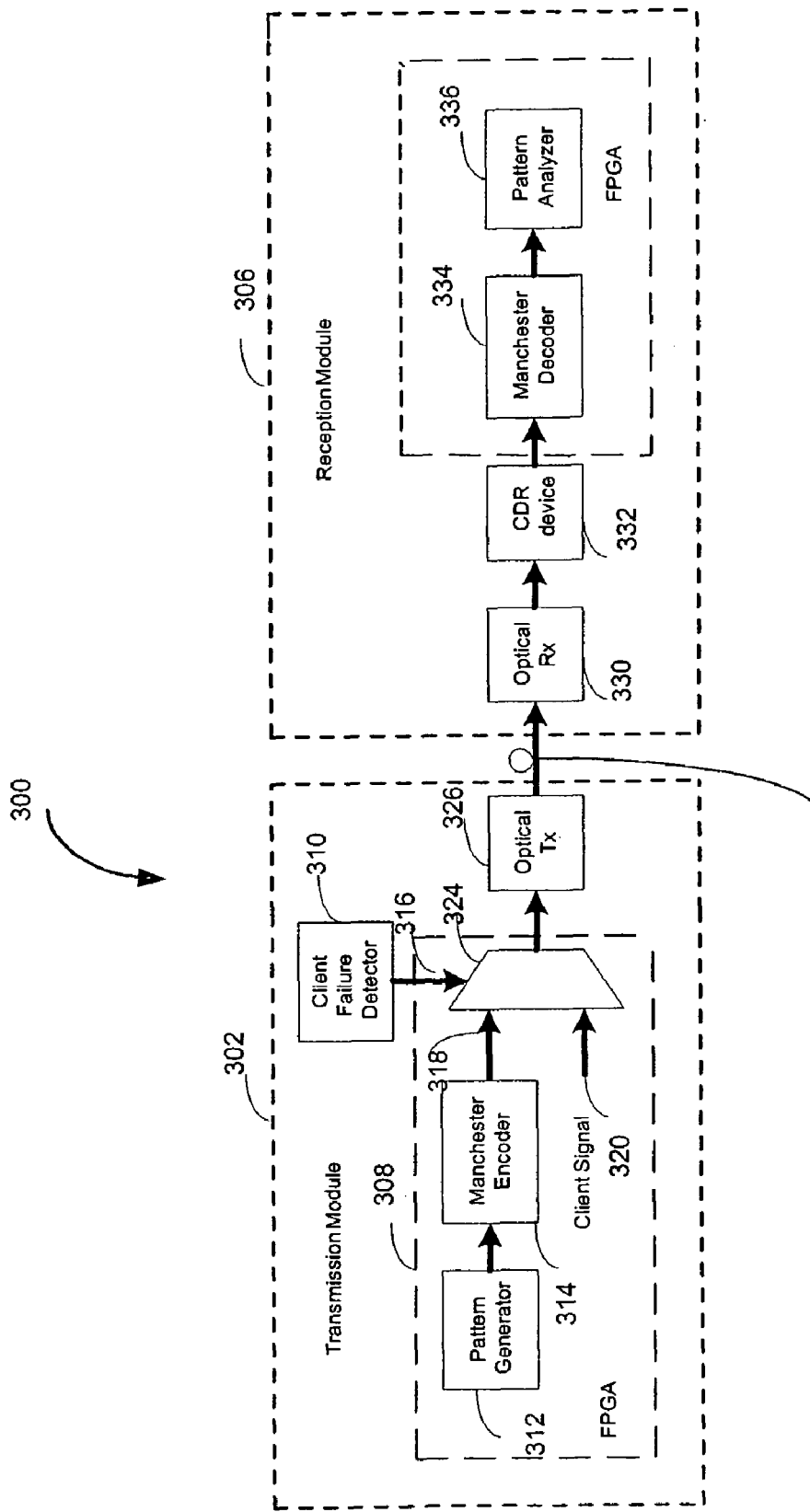
FIG. 3 shows an implementation of the system.

A system 300 that implements the method is shown in FIG. 3. Each node includes two modules, a transmission module 302 and a reception module 306. The transmission module 302 is responsible for generating the Signature signal that is switched in and transmitted over the network 304 on the occurrence of a client failure. The reception module 306 is responsible for receiving and analyzing the received signal. The operations performed by the two modules are explained.

The logic for implementing the method is achieved with the help of Field Programmable Gate Arrays (FPGA's). The transmission module consists of FPGA 308, a Client Failure Detector 310 and an Optical Transmitter 326. The FPGA 308 implements a Pattern Generator 312, a Manchester Encoder 314, and a multiplexer 324. The output of the Pattern Generator 312 is connected to the input of the Manchester Encoder 314. The output of the Manchester Encoder 314 is connected to the input 318 of the multiplexer 324. Another input 320 of the multiplexer 324 is connected to the client where as the output of the Client Failure Detector 310 is applied to the control input 316 of the multiplexer 324. The output of the multiplexer 324 is connected to the input of an Optical Transmitter 326. The output of the Optical Transmitter 326 is connected to the network 304 which is connected to the reception module 306 of the receiver node.

The reception module 306 consists of an Optical Receiver 330, a CDR device 332 and an FPGA 328. The FPGA implements a Manchester decoder 334 and a Pattern Analyzer 336. The signal arriving from the network 304 is applied to the input of the Optical Receiver 330 the output of which is connected to the input of the CDR device 332. The output of the CDR device 332 is connected to the input of the Manchester Decoder 334 the output of which is connected to the input of the Pattern Analyzer 336.

The Pattern Generator 312 in the transmission module 302 is responsible for generating the Signature signal containing the fault code that will create a client signal like optical signal to allow Wavelength Tracker to continue to operate in the event of a loss of a client signal. This data must be detected as the Signature Signal at the reception module 306 of the receiver node so that appropriate actions can be taken (such as generating a protocol specific failure signal from the client port). In order to avoid the appearance of valid signal, the data pattern being sent is chosen to be invalid codes, invalid 8B/10B codes, for example [IEEE Std 802.3-2002, CSMA/CD access method and physical specifications, Mar. 8, 2002, Table 36-1]. Code selection can be performed in such a way that the maximum Hamming distance from valid and more common codes is maintained. There are 256 valid 8B/10B codes as well as 12 special characters. The Signature signal could be made up of the remaining 756 invalid codes. This will ensure that the Signature signal is not be mistaken for valid client signal containing 8B/10B signals.

Figure 4:
FIG. 4 provides an example of a fault code.

The Signature signal is made up of several invalid codes strung together and sent in a repeating pattern (see FIG. 4). This repeating pattern allows the reception module at the receiver node to quickly determine that the Signature signal is present.

While it is important that the Signature signal does not appear as valid client signal to the decoder, optically it must have the same characteristics. As with valid client signal, the Signature signal must be DC balanced (meaning that it must not have long periods of ones or zeroes). In order to achieve this, the Signature signal is Manchester encoded [IEEE Std 802.3-2002, CSMA/CD access method and physical specifications, Mar. 8, 2002, Section 7.3.1.1]. This ensures that every time there is a one, there is also a zero. FIG. 5 shows an example of Manchester encoding. In order to keep the downstream CDR device 332 locked to the network data, it is important that the Signature signal remain at the same baud rate as that of the failed client signal. Since Manchester encoding doubles the baud rate, it is necessary for the transmitted data rate to be halved before being Manchester encoded. This ensures that the baud rate (after Manchester encoding) remains the same as the failed client signal and that the downstream CDR devices remain locked. This in turn minimizes alarm propagation through the network.

When a client failure occurs, the output of the Client Failure Detector 310 connected to the control input 316 of the multiplexer 324 in FIG. 3 causes the Manchester encoded Signature signal to be switched in. This signal, available at the output of the multipexer 324, is then transmitted by the Optical Transmitter 326 over the network 304. The incoming data is monitored and analyzed at the receiver node.

At the reception module 306, in the receiver node the Optical Receiver 330 receives the optical signal and presents it onto the CDR device 332. This device 332 keeps the local clock synchronized and passes on the data to the Manchester Decoder 334. The Manchester Decoder 334 presents the decoded data to a Pattern Analyzer 336 that analyzes the data. If a Signature signal is detected the appropriate alarm is raised. Note that an alarm is raised only when several cycles of the repeating pattern have been detected.

This system offers several advantages:
a) Client failure is detected;
b) An optical signal remains present to allow Wavelength Tracker to continue to function;
c) Signal being generated is DC balanced;
d) Downstream CDRs do not lose lock; and
e) Some alarms including those triggered by the loss of a CDR lock do not propagate through the network.

Numerous modifications and variations of the present invention are possible in light of the above teachings. For example, during network installation, or in other controlled environments, this system can be used for messaging using a pre-defined Manchester encoded protocol. The Pattern Generator can generate the different codes that correspond to the different messages. The system can also be used for link integrity checking. The Pattern Generator in the transmission module can be used to generate a Pseudo-Random Bit Stream (PRBS) that can be sent over a link to the next node in the network at which the received signal is compared in the Pattern Analyzer with the transmitted PRBS. A mismatch would indicate faults associated with the link. It is therefore to be understood that within the scope of the appended claims, the invention may be practiced otherwise than as specifically described herein.

We claim:

1. A method for providing a Signature signal in an optical network in the event of failure of a client, the optical network contains channels, each having a unique tag in a form of a low frequency dither tone modulation called Wavekey generated by a Wavelength Tracker technology, the method comprising the steps of:
   detecting a failure of a client;
   switching in the Signature signal for identifying failure of a client;
   transmitting said Signature signal though the optical network as a transmitted signal;
   receiving said transmitted signal at a receiver node as a received signal; and
   analyzing said received signal;
   wherein said Signature signal is a sequence of fault codes in a repeating pattern and includes said Wavekey; and
   wherein the step of switching in the Signature signal comprises the steps of:
   generating the Signature signal;
   encoding the Signature signal; and
   replacing a lost client signal with an encoded Signature signal.

2. A method as in claim 1, wherein the step of analyzing the received signal comprises steps of:
   decoding said received signal for producing a decoded signal;
   performing pattern analysis on the decoded signal; and
   raising alarm when the Signature signal is present in said decoded signal.

3. A method as claimed in claim 2, wherein the step of decoding said received signal comprises the step of:
   converting said encoded signal into the decoded signal using Manchester decoding.

4. A method as in claim 1, wherein the step of generating the Signature signal comprises the step of:
   generating a sequence of a fault code in a repeating pattern;
   wherein the fault code is a sequence of invalid codes.

5. A method as claimed in claim 4, wherein the invalid codes used are invalid 8B/10B codes.

6. A method as in claim 1, wherein the step of encoding the Signature signal comprises the step of:
   converting the Signature signal into a Manchester encoded signal.

7. A method as claimed in claim 1, wherein the optical network is based on an Any-rate architecture.

8. A system for providing a Signature signal in an optical network in the event of failure of a client, the optical network contains channels, each having a unique tag in a form of a low frequency dither tone modulation called Wavekey generated by a Wavelength Tracker technology, the system comprising:
   a transmission module for generating and transmitting the Signature signal for identifying failure of a client, wherein the transmission module comprises:
   a client failure detector for identifying of the client;
   a Pattern Generator for generating the Signature signal;

a Manchester Encoder for encoding said Signature signal;

a multiplexer for switching in the Signature signal; and an Optical Transmitter for transmitting the Signature signal on the optical network; and a reception module for receiving and analyzing the Signature signal-from the Optical Transmitter;

wherein the output of the transmission module is connected to the input of the reception module though the optical network, and the Signature signal is a sequence of fault codes in a repeating pattern and includes said Wavekey.

9. A system as claimed in claim 8, wherein the reception module comprises:

an Optical Receiver for receiving the Signature signal;

a Clock and Data Recovery (CDR) device for recovering clock and data;

a Manchester Decoder for decoding said Signature signal; and a Pattern Analyzer for analyzing decoded Signature signal.

10. A system as claimed in claim 8, wherein the optical network is based on an Any-rate architecture.

\* \* \* \* \*

UNITED STATES PATENT AND TRADEMARK OFFICE
CERTIFICATE OF CORRECTION

| | |
|---|---|
| PATENT NO. | : 7,389,044 B2 |
| APPLICATION NO. | : 11/184966 |
| DATED | : June 17, 2008 |
| INVENTOR(S) | : D.M.R. Holmes et al. |

Page 1 of 1

It is certified that error appears in the above-identified patent and that said Letters Patent is hereby corrected as shown below:

Column 6, line 19, "though" is corrected to read as --through--.

Column 7, line 9, "though" is corrected to read as --through--.

Signed and Sealed this

Sixteenth Day of September, 2008

JON W. DUDAS
*Director of the United States Patent and Trademark Office*